(No Model.)

C. H. GOODRICH.
COCK.

No. 266,132.  Patented Oct. 17, 1882.

Witnesses:
C. P. Judd
A. L. White

Inventor
C. H. Goodrich
by Mighto Brown
Atty

United States Patent Office.

CHARLES H. GOODRICH, OF STONEHAM, MASSACHUSETTS.

COCK.

SPECIFICATION forming part of Letters Patent No. 266,132, dated October 17, 1882.

Application filed August 10, 1882. (No model.)

*To all whom it may concern:*

Be it known that I, CHARLES H. GOODRICH, of Stoneham, in the county of Middlesex and State of Massachusetts, have invented certain Improvements in Cocks, of which the following is a specification.

This invention relates to the common devices for limiting the rotation of the plug of a gas or other cock, said devices consisting of a projection attached to and rotating with the plug, and fixed shoulders on the barrel of the cock arresting said projections when the cock is closed.

The invention consists in forming the projection or rotating member of the stop on the washer ordinarily used in securing the plug to the casing, thus enabling said washer to perform two functions, and saving the expense of a separate part on the cock to serve as the movable member of the stop, as I will now proceed to describe and claim.

Figure 1:
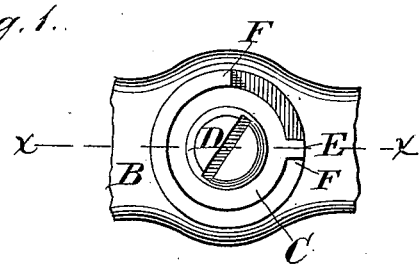
Figure 2:
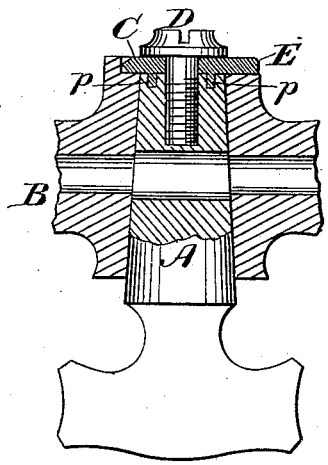
Figure 3:
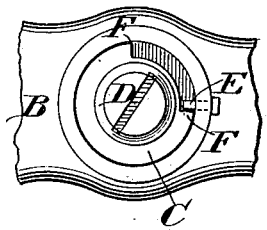

Of the accompanying drawings, forming a part of this specification, Figure 1 represents a top view of a cock embodying my improvement. Fig. 2 represents a section on line $x\,x$, Fig. 1. Fig. 3 represents a top view of a modification.

The same letters of reference indicate the same parts in all the figures.

In the drawings, A represents a cylindrical plug of ordinary form.

B represents the barrel or casing of the cock, in which the plug is fitted so as to rotate.

C is the washer, which is secured, as usual, to the end of the plug by a screw, D, said washer being larger than the end of the plug, and bearing on a seat formed for it on the barrel. The plug is arrested, when closed, by a stop composed of two members, one of which rotates with the plug while the other is formed on the barrel.

In carrying out my invention I form the movable member of the stop on the washer C. In Figs. 1 and 2 I have shown said movable member in the form of a stud, E, projecting from the periphery of the washer, the fixed member being two shoulders, F F, formed on the barrel B. In Fig. 3 the shoulders are formed on the washer and the stud is attached to the casing, the result being the same in either case.

It will be seen that by my improvement the plug is enabled to be readily separated from the member of the stop which rotates with it, so that the periphery of the plug can be readily ground.

It is also obvious that the washer is caused to serve as the movable member of the plug, arresting stop in addition to its usual function, thus saving the expense and labor required in attaching a separate device to the plug to serve as the movable member of the stop.

The washer may be engaged with the end of the plug by projections $p$ on the washer entering cavities in the plug, as shown in Fig. 2, so that the washer cannot turn independently on the plug, and thus displace the member of the stop formed on the washer.

I claim—

1. In a cock, the barrel or casing having the fixed member of the plug, arresting stop, combined with the washer attached, as usual, to the plug, and serving to connect the latter to the barrel, and provided with the stud E or its equivalent, whereby said washer is enabled to serve as the movable member of said stop in addition to its usual function, as set forth.

2. In a cock, the combination of a cylindrical plug, the barrel having the fixed member, of the top and the detachable washer having the movable member of the stop, and pins $p\,p$, entering orifices in the end of the plug, whereby independent movement of the washer is prevented, as set forth.

In testimony whereof I have signed my name to this specification, in the presence of two subscribing witnesses, this 7th day of August, 1882.

CHAS. H. GOODRICH.

Witnesses:
C. F. BROWN,
A. L. WHITE.